Oct. 16, 1934.  M. J. GOALSTONE  1,977,056
REFRIGERATING SHOW CASE
Filed Feb. 16, 1931   2 Sheets-Sheet 1

INVENTOR.
Michael J. Goalstone
BY
Rollander & Stratton
ATTORNEYS

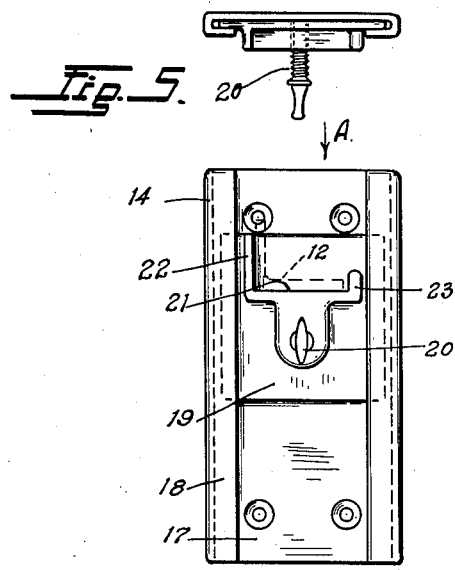
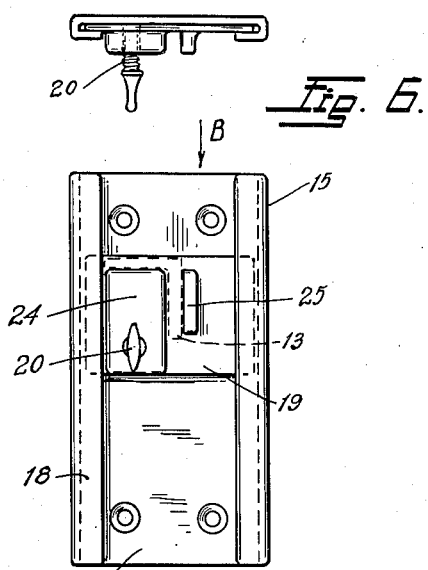
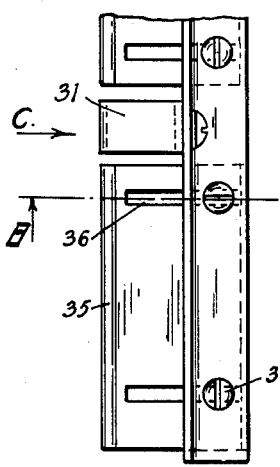
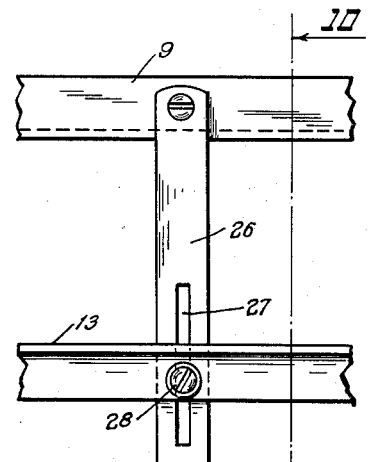
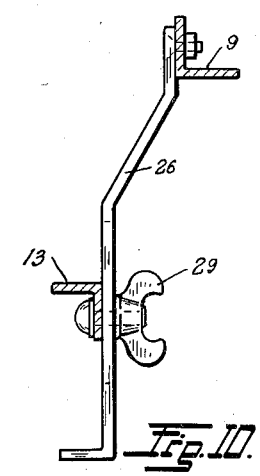
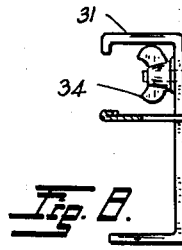
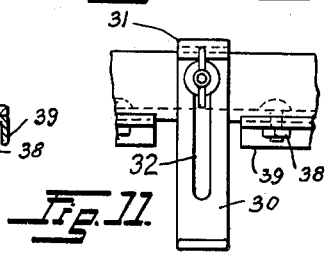

Patented Oct. 16, 1934

1,977,056

UNITED STATES PATENT OFFICE 1,977,056

REFRIGERATING SHOW CASE

Michael J. Goalstone, Denver, Colo., assignor to The National Store Fixture Co., Denver, Colo., a corporation Application February 16, 1931, Serial No. 515,975

8 Claims. (Cl. 62—89.5)

My invention relates to refrigerating show cases, and particularly to the construction and arrangement of means within the case for the display of merchandise.

An important object of the invention is to provide simple means for the control of the circulation of air, the temperature and the humidity within the case, without in any way disturbing the cooling unit within the case.

At the present time, there is a growing tendency on the part of butcher shops to handle what is known in the trade as "quick-chill" products; that is, products that have been quickly chilled or frosted on the surface. In the case of meat, this quick chill retains all of the juices within the meat and does not affect the tissues on the interior of the cuts of meat.

Since this is a growing line of goods, many butcher shops, which includes the smaller shops, must handle in the same show case both quick chill meats and meats not frosted. It is an object of my invention to provide the proper temperature for each kind of meat product in the same case.

Another object is to provide means in such a show case, whereby the cooled air travels from the back to the front of the case and then returns, whereby circulation is effected.

Other objects too numerous to mention reside in the details of construction and in novel combinations and arrangements of parts, which will appear in the course of the following description.

In the drawings, like reference characters designate similar parts in the several views.

Figures 3 and 4 are face views of adjustable brackets comprised in the invention.

Figures 5 and 6 are end views of the brackets, looking in the direction of the arrows "A" and "B" of Figures 3 and 4.

Figure 7 is a broken plan view of a shutter mechanism comprised in the invention.

Figure 8 is a section taken on the line 8—8 of Figure 7.

Figure 9 is a broken elevation of a bracket hereinafter more fully described.

Figure 10 is a section taken on the line 10—10 of Figure 9.

Figure 11 is a broken elevation looking in the direction of the arrow "C" of Figure 7.

Figure 1:
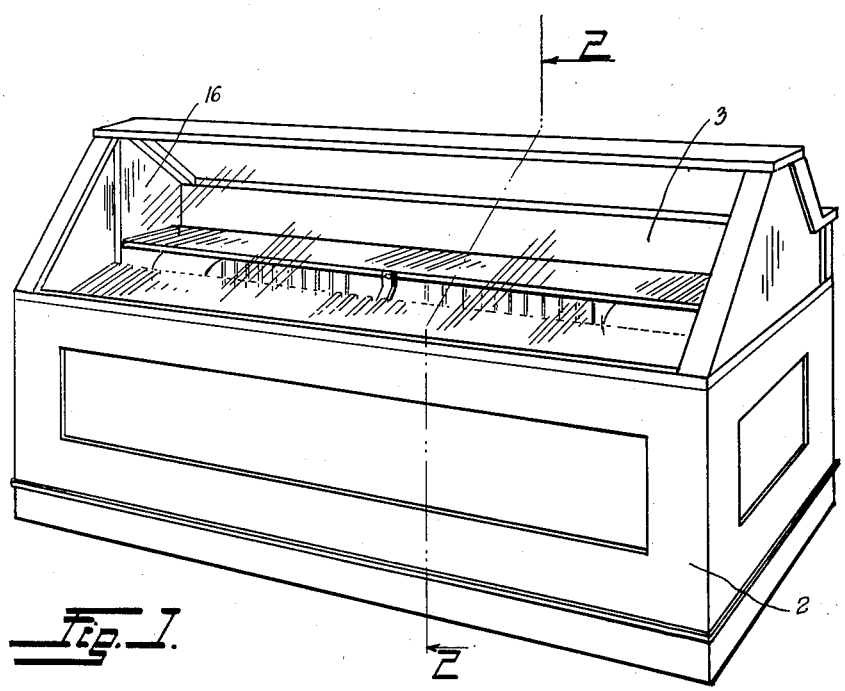
Figure 1 is a perspective view of a refrigerating show case, to which my improvements have been applied.

Referring more in detail to the drawings, the reference numeral 2 designates generally a refrigerator, which has a display chamber 3. The details of the case itself will not be described, since they form no part of the present invention, with the exception of the floor 4 of the display compartment, which will be more fully described hereinafter. For a description of the show case itself, reference is made to my United States Letters Patent No. 1,690,485, issued on the 6th day of November, 1928. A front wall 5 and rear wall 6 will be referred to hereinafter, so are given reference characters.

It is to be understood that my means of controlling the circulation, temperature and humidity may be used with any refrigerator, so the details of the latter are relatively unimportant.

Front and rear racks 7 and 8 respectively are provided for the support of merchandise containers, such as platters, cartons, etc. In the present case, it is preferred to have the rear rack 8 relatively fixed. Angle irons 9 and 10 extend lengthwise of the case and support the rear rack 8. Brackets 11 are fastened to the angle irons and in turn are supported on the end walls 16 of the case.

Figure 2:
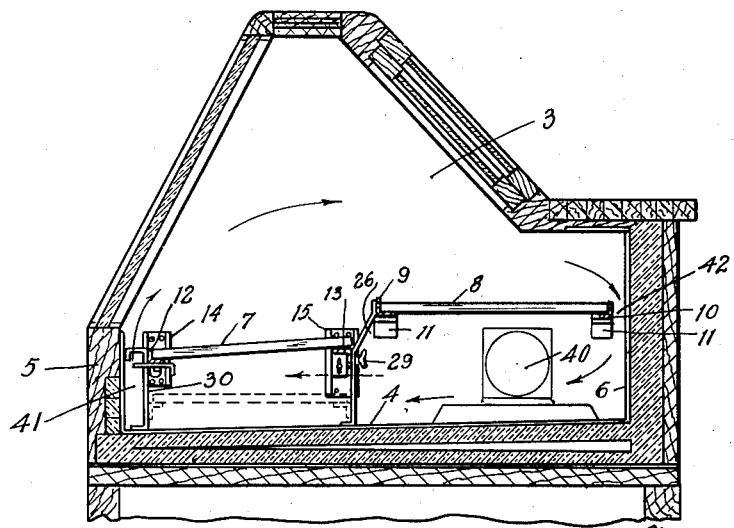
Figure 2 is a broken section taken on the line 2—2 of Figure 1.

The front rack is supported by angle irons 12 and 13, which also extend the length of the case. The racks rest on the open part of the angle of the irons 9, 10 and 12 and on the back of the iron 13, as shown in Figure 2.

The irons 12 and 13 are respectively supported by adjustable brackets 14 and 15, best shown in Figures 3 and 4. The brackets comprise a back member 17 having countersunk holes for screws used in fastening same on the end walls of the case. Each back member also has flanges 18 bent upon itself to provide a slide-way for a sliding plate 19 held in any of its positions by a set screw 20. The only difference between the brackets 14 and 15 is in the plates 19. In bracket 14, the sliding plate carries a seat 21 having upturned fingers 22 and 23 for the support of an angle iron, as shown in broken lines in Figure 3. In bracket 15, the plate 19 carries a boss 24 and a lug 25 spaced from each other to provide space for the leg of an angle iron therebetween, as shown in broken lines in Figure 4.

The angle iron 13 is supported at an intermediate point between its ends by a leg 26, resting on the floor 4 of the case. The leg 26 has a slot 27 for a screw 28 on the angle iron 13. A wing nut 29 holds the iron in its adjusted positions on the leg 26.

Another leg 30 supports the angle iron 12 at its mid point. The leg has an arm 31, which spaces the member 12 from the front wall 5 of the case, to provide an air passage. The leg 30 has a slot 32. A screw 33 in the slot 32 and a wing nut 34 hold the member 12 in its adjusted positions.

Mounted on the angle iron 12 and on the opposite sides of the arm 31 are shutters 35 which extend the length of the case and have slots 36. Bolts 37 and nuts 38 support the shutters on the member 12, but provide for a sliding movement, by which the shutters are opened or closed. The shutters have a lip 39 which facilitates their movement.

An electric cooling unit is indicated at 40, although it is to be understood that any other suitable cooling means may be used.

The manner of using the means for controlling the circulation, humidity and temperature is simple but very effective. It is clear that the more rapidly that the cool air circulates through the case, the lower the temperature and the less humidity. On the contrary, if the circulating air must travel a more devious and less direct path, the circulation is retarded, whereby the air loses some of its coolness, thus causing higher temperatures. Moreover, since the circulation of the air is retarded, the humidity increases proportionately.

When the front rack is in the position shown in full lines in Figure 2, most of the space between the rack is closed by the platters or other containers on the front rack. Thus the cooled air travels under the front rack toward the front wall 5 of the case.

It will be noted that the floor slopes down toward the front wall. Warm air rises, but cool air descends. Cool air flows downward with less resistance than upward, so that the slope of the floor will cause the cool air to travel toward the front wall.

The spacing arm 31 provides a cold air passage 41 between the front rack and the front wall. A warm air passage 42 is provided between the rear rack and the rear wall 6 of the case. During operation, the air circulates in a path indicated by the full line arrows in Figure 2. It is clear that the rate of circulation, and hence the temperature and humidity above the racks may be changed by moving the shutters 35 to different positions. The temperature and humidity may be different at opposite ends of the case by opening the shutters 35 different degrees.

When the front rack, or a section thereof, is lowered to the broken line position, shown in Figure 2, it will be apparent that the cooled air will travel across and above the front rack, as indicated by the broken line arrow, and not below the front rack.

When the cooled air crosses above the front rack, the circulation is more direct and the cooled air passes directly on to the products on the front rack. This is desirable for quick-chilled products, for the temperature is from fifteen to twenty degrees lower on the front rack when it is lowered to its dotted line position than when in the full line position of Figure 2. Of course, the front rack may be fastened in any intermediary point between the two positions.

It is to be understood that changes may be made in the details of construction and arrangement of parts, without departing from the spirit of my invention.

What I claim and desire to secure by Letters Patent is:

1. A refrigerating show case containing front and rear display racks providing a space therebetween, means for the vertical adjustment of one rack to thereby change the size of the space between the racks, refrigerating means disposed for the circulation of cooled air through said space.

2. A refrigerating show case comprising front and rear display racks providing a space therebetween, a cooling unit under the rear rack, and vertically movable means adapted to hold the front rack in various elevated positions with respect to said unit, whereby air from the cooling unit passes over or under the front rack.

3. A refrigerating show case comprising front and rear display racks providing a space therebetween, a cooling unit under the rear rack, the front rack being movable vertically relative to the rear rack to positions whereby air from the cooling unit may be caused to pass over or under the front rack, and means adapted to support the front rack substantially horizontally in its various elevated positions.

4. A refrigerating show case containing an adjustable display rack, members supporting the rack extending longitudinally of the case, sliding plates for the support of said members, back members having flanges bent upon same for the sliding support of the plates, fastening means on the plates cooperating with the back members to hold the plates in desired positions, and relatively stationary refrigerating means for cooling merchandise on the rack.

5. A refrigerating show case comprising front and rear display racks providing a space therebetween, a cooling unit under the rear rack, vertically movable means adapted to hold the front rack in various elevated positions with respect to said unit whereby air from the cooling unit may pass over or under the front rack, and an adjustable shutter controlling the movement of air passing under said front rack.

6. A refrigerating show case comprising front and rear display racks providing a space therebetween, a cooling unit under the rear rack, the front rack being movable vertically relative to the rear rack to positions whereby air from the cooling unit may be caused to pass over or under the front rack, means for the support of the front rack in its various elevated positions, and means carried by said supporting means for controlling the movement of air passing under the front rack.

7. In a refrigerating show case, an adjustable display rack longitudinally of the case, sliding elements for the support of the rack, means for holding the sliding elements in selected positions, whereby to maintain the rack at predetermined elevations in a substantially horizontal plane, and a refrigerating unit in the case in a fixed position relative to said rack.

8. In a refrigerating show case, an adjustable display rack longitudinally of the case, sliding plates for the support of said rack, back members providing guideways for the sliding plates, fastening means on the plates cooperating with the back members to hold the plates in selected positions, whereby to maintain the rack at predetermined elevations in a horizontal plane, and a refrigerating unit in the case in a fixed position relative to said rack.

MICHAEL J. GOALSTONE.